Patented Sept. 9, 1952

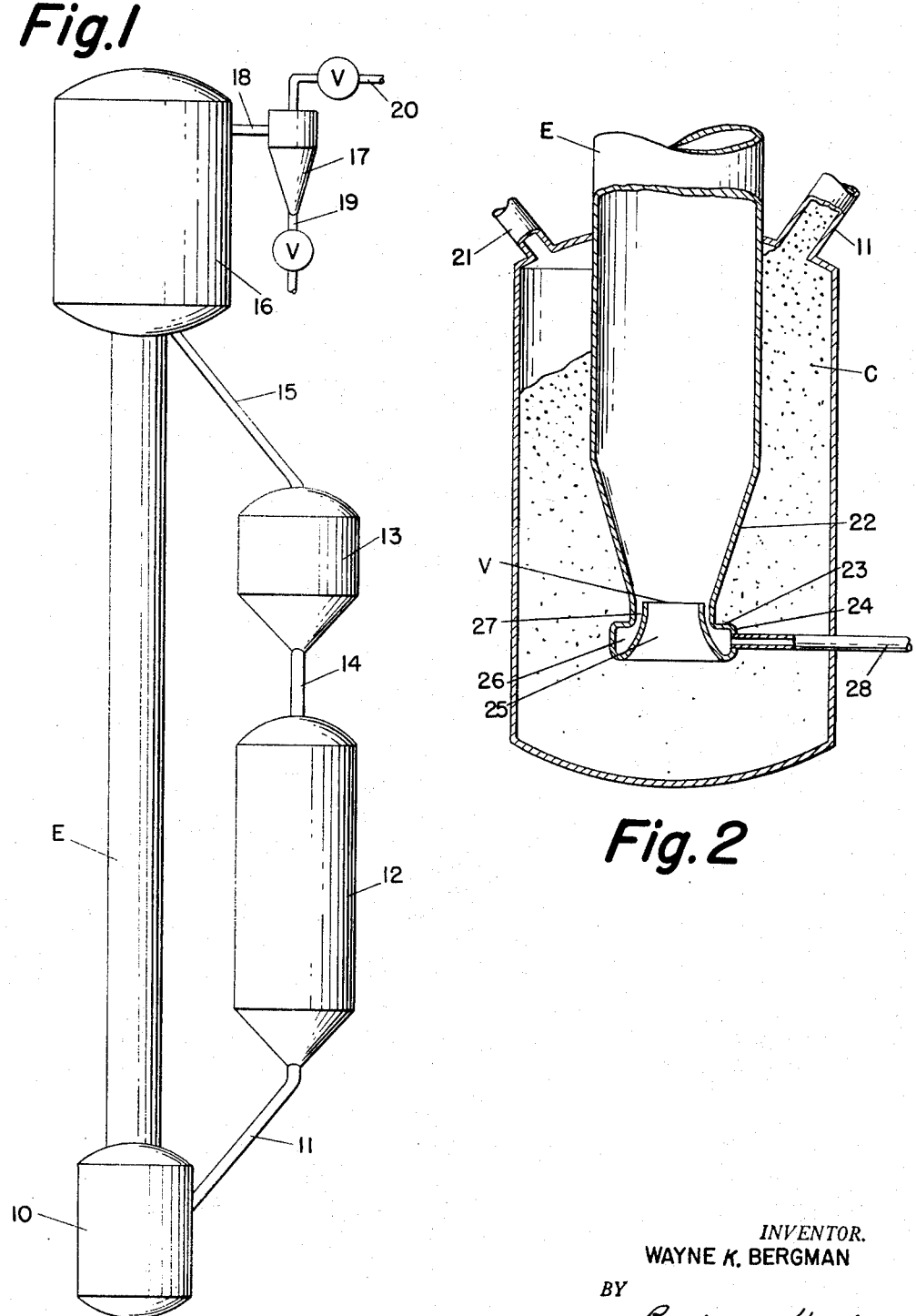

2,610,093

UNITED STATES PATENT OFFICE 2,610,093

PNEUMATIC LIFT CONDUIT

Wayne K. Bergman, Toledo, Ohio, assignor to Sun Oil Company, Philadelphia, Pa., a corporation of New Jersey Application December 22, 1950, Serial No. 202,324

1 Claim. (Cl. 302—53)

This invention relates to a system and apparatus for moving pneumatically granular or pelleted contact material or catalyst from a lower vessel, which receives the material in a continuous stream, upwardly into an upper vessel. In particular the invention is directed to apparatus for supplying gas, air or other fluid lifting medium to the material in the lower vessel in order to convey it therefrom to and through an elevating conduit in such a manner as to reduce attrition of the material particles or pellets to a minimum during passage to the upper vessel.

It is well known in the art of catalytic operations, such as the cracking of heavier petroleum fractions to gasoline and other hydrocarbon processing operations to use granular or pelleted catalytic or contact material in a continuous system. In such systems a conversion zone is operated continuously to produce the desired product while a second zone operates continuously in regeneration. Most commercial moving catalyst systems have the conversion zone and regeneration zone in superposed relationship with the conversion zone usually above the regeneration zone so that the catalyst or contact material moves through the conversion zone to the regeneration zone by gravity and after regeneration it is carried upwardly and returned to the conversion zone to repeat the cycle of operation. To return the catalyst or contact material from the lower regeneration zone to the upper conversion zone two well known means applicable to the transportation of granular solids from one locus to another have been used namely: by mechanical conveyers and by pneumatic conveyers, in the latter of which air, steam or flue gas produced at the refinery is readily available as the pneumatic lifting medium.

It is necessary in systems employing conversion and regeneration zones in superposed relationship to convey the catalyst or contact material which is in pelleted or granular form continuously upwardly to a height of several hundred feet, in order that it can be delivered continuously by gravity to the conversion and regeneration zones and maintain them in operation. Conveying the material upwardly by a fluid medium requires a vessel positioned at a level below that of the lower reaction zone which is designed to initiate the lifting or upward conveying operation. This lowermost vessel is generally known in the art as an engager since the material is engaged therein by the lifting fluid to effect the lifting operation. A lift conduit has its lower end extending into or is in communication with the engager vessel while its upper end communicates with an upper vessel positioned at a level above the level of the upper end of the upper reaction zone or chamber. The upper vessel is designed so that the lifting medium is separated from the catalyst or contact material and is generally known as the disengager.

Specifically the present invention is directed to the engager portion of a continuous catalyst or contact material system and the particular arrangement for supplying the lifting medium to the inlet end of the elevating conduit which is within the engager in order to provide a suction effect or low pressure area adjacent the inlet to more readily convey the material upwardly of the conduit and with a minimum of attrition of the material.

Referring to Figure 1, the engager is indicated at 10 and receives the catalyst or contact material by gravity continuously through line 11 from the regeneration zone 12 positioned below the upper conversion zone 13 which is in communication with zone 12 through line 14. The conversion zone 13 receives the material by gravity continuously by line 15 from the disengager 16. A conduit for elevating the contact material from the engager to the disengager 16 is shown generally at E. Separating means such as a cyclone separator 17 is in communication with the disengager 16 through line 18 and fines are removed from the separator through line 19 while the lifting medium is removed from the separator through line 20. Figure 1 does not show any details of the present invention and is provided only to show the general arrangement of a system wherein catalyst or contact material is utilized in the form of a continuously moving mass.

Referring to Figure 2, the engager 10 is shown substantially full of contact material C which is supplied thereto by conduit 11 from the regeneration zone 12 of the system, as heretofore explained in connection with Figure 1. A fluid medium is supplied directly to the body of material C by line 21 or the fluid may be supplied to an annular pocket (not shown) within the body of material to exert equal downward pressure circumferentially of and within the body of material as disclosed in the application of John F. McKinney, Jr., Serial No. 184,601, filed September 13, 1950. The supply of the fluid medium directly to the mass of material operates to urge the material downwardly and then to pass upwardly into the lower end of conduit E.

According to the present invention the lower end of conduit E is modified to provide a vacuum or low pressure area adjacent its lower end in order that the material forced into the lower end shall be picked up in this zone and lifted into the conduit E by an independent supply of lifting fluid medium admitted at high velocity. The continuous supply of high velocity lifting medium will continue to elevate the material in a stream until it reaches the upper vessel.

Referring again to Figure 2 this is accomplished by forming an inwardly tapered section 22 at the lower end of conduit E and providing an outwardly extending flange portion 23 having a depending sidewall 24 which terminates in an upstanding nozzle 25. The nozzle 25 extends upwardly and inwardly of the conduit E from the depending sidewall 24 and forms therewith pocket 26; and the upper end of the nozzle 25 terminates adjacent the lower end of the tapered portion 22 providing an annular space 27 therewith which provides communication between the pocket 26 and the tapered section of the conduit. Lifting fluid medium is supplied to space 26 by conduit 28.

In operation, lifting fluid will be supplied, for example, by conduit 21 and will be directed downwardly through the contact material at sufficient pressure to diffuse through the material and maintain the material in a state of agitation and will pass upwardly through the contact material into the nozzle 25 carrying material along therewith, while lifting fluid supplied through conduit 28 to the pocket 26 will pass through the restricted annular opening 27 to pick the contact material up by suction about vacuum zone V and lift it upwardly of the tapered section 22 from which it will pass into the elevating conduit 25 and be elevated to the upper vessel 16 (shown in Figure 1).

I claim:

Apparatus for elevating granular material from a lower chamber containing a body of the material to an upper chamber which comprises an upright elevating conduit having its outlet end positioned within the upper chamber and its inlet end positioned within the lower chamber, said conduit having an inwardly tapered lower portion terminating in a relatively narrow inlet, a lateral flange extending outwardly from said inlet, a sidewall depending from said lateral flange, a tapered nozzle having an upper narrowed end extending into the narrow inlet of the conduit providing a confined annular space therewith and a lower widened end connected to said sidewall forming therewith and with said lateral flange a pocket which communicates through said annular space with the tapered portion of the conduit, means for supplying a fluid medium to the body of material in the lower chamber to force the material upwardly through the widened end of said nozzle and into the tapered portion of the conduit and means for supplying a fluid medium to said pocket for passage through the annular space to elevate the material through the tapered portion of the conduit, upwardly into and through the elevating conduit to the upper chamber.

WAYNE K. BERGMAN.

REFERENCES CITED

The following references are of record in the file of this patent:

UNITED STATES PATENTS

| Number | Name | Date |
|---|---|---|
| 528,418 | Duckhan | Oct. 30, 1894 |

FOREIGN PATENTS

| Number | Country | Date |
|---|---|---|
| 180,397 | Great Britain | May 11, 1922 |
| 701,793 | France | Mar. 23, 1931 |